United States Patent
Terabe

(10) Patent No.: US 11,977,798 B1
(45) Date of Patent: May 7, 2024

(54) IMAGE FORMING APPARATUS AND IMAGE FORMING METHOD INCLUDING FIRST AND SECOND USER INFORMATION

(71) Applicant: Toshiba Tec Kabushiki Kaisha, Tokyo (JP)

(72) Inventor: Emiko Terabe, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/187,952

(22) Filed: Mar. 22, 2023

(51) Int. Cl.
*G06F 3/12* (2006.01)

(52) U.S. Cl.
CPC .......... *G06F 3/1238* (2013.01); *G06F 3/1203* (2013.01); *G06F 3/1222* (2013.01); *G06F 3/1286* (2013.01)

(58) Field of Classification Search
CPC .... G06F 3/1238; G06F 3/1203; G06F 3/1222; G06F 3/1286
USPC ....................................................... 358/1.14
See application file for complete search history.

(56) References Cited

U.S. PATENT DOCUMENTS

| | | | | |
|---|---|---|---|---|
| 9,501,252 B2 * | 11/2016 | Komatsubara | ........ | G06F 3/1286 |
| 9,690,522 B2 | 6/2017 | Yasukawa | | |
| 11,256,455 B2 | 2/2022 | Kuroda | | |
| 2004/0130743 A1 * | 7/2004 | Nozato | ................. | G06F 21/608 |
| | | | | 358/1.14 |
| 2015/0116761 A1 * | 4/2015 | Yamada | ................ | G06F 3/1265 |
| | | | | 358/1.15 |
| 2017/0269884 A1 * | 9/2017 | Komatsu | ............... | G06F 3/1238 |
| 2022/0083300 A1 * | 3/2022 | Saito | ..................... | G06F 3/1203 |

FOREIGN PATENT DOCUMENTS

| | | |
|---|---|---|
| JP | 2017-049718 A | 3/2017 |
| JP | 2017-117494 A | 6/2017 |

* cited by examiner

*Primary Examiner* — Allen H Nguyen
(74) *Attorney, Agent, or Firm* — FOLEY & LARDNER LLP

(57) ABSTRACT

An image forming apparatus includes a communication interface, a printer, and a processing circuit. The communication interface is configured to receive a message regarding a print job and including first user information of a first domain. The processing circuit includes a processor caused to: store second user regarding users who can perform printing and belonging to a second domain different from the first domain, and link information regarding linking the first user information and the second user information; extract the first user information from the message based on a determination that the first user information is linked to the second user information in the link information; print an image based on the printing job using the printer; and based on a determination that the first user information is not linked to the second user information in the link information, generate a registration URL for registering the link information.

20 Claims, 5 Drawing Sheets

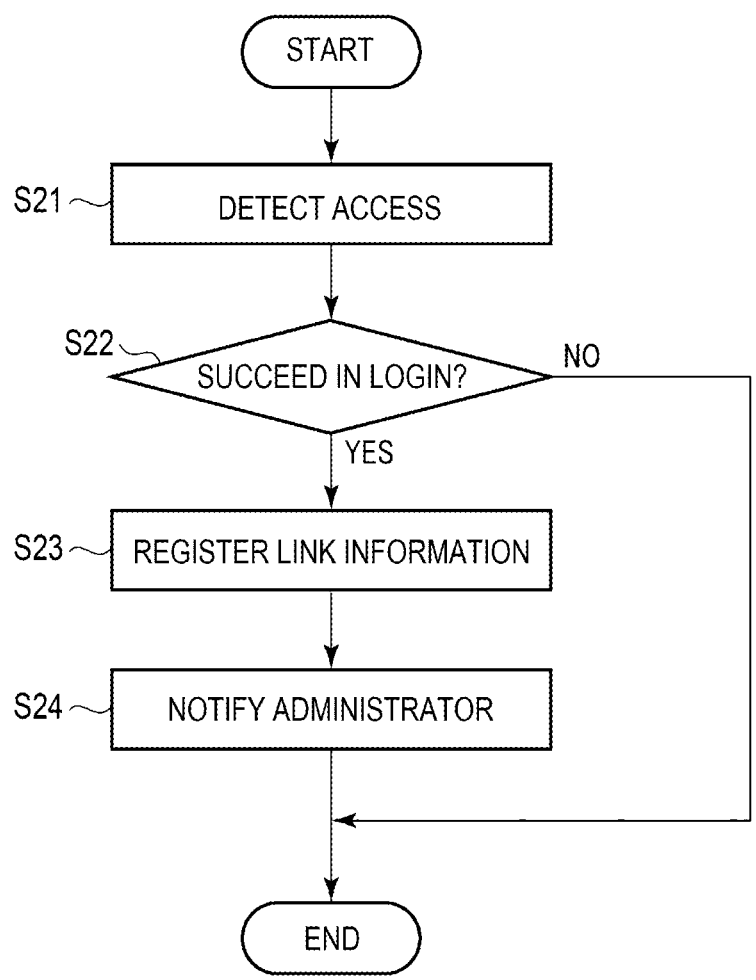

IMAGE FORMING APPARATUS AND IMAGE FORMING METHOD INCLUDING FIRST AND SECOND USER INFORMATION

FIELD

Embodiments described herein relate generally to an image forming apparatus and an image forming method.

BACKGROUND

An image forming apparatus prints an image after performing authentication processing (authentication processing such as an active directory) using a domain. Such an image forming apparatus extracts user information belonging to a predetermined domain from a printing job. The image forming apparatus compares user information registered in advance and the extracted user information to authenticate a user.

However, if the domain of the extracted user information is different from a domain of the user information registered in advance, the image forming apparatus cannot authenticate the user even if the extracted user information and the user information registered in advance indicate the same user.

In order to solve the problem, an image forming apparatus and an image forming method that can effectively authenticate a user are provided.

DESCRIPTION OF THE DRAWINGS

FIG. 5 is a flowchart illustrating an operation example of the MFP of FIG. 2, according to some embodiments.

DETAILED DESCRIPTION

According to an embodiment, an image forming apparatus includes a communication interface, a printer, a memory, and a processor. The communication interface receives a printing job including first user information belonging to a first domain. The printer prints an image. The memory stores second user information indicating a user who can perform printing and belonging to a second domain different from the first domain and link information for linking the first user information and the second user information. The processor extracts the first user information from the printing job, if the first user information is linked to the second user information in the link information, prints the image based on the printing job using the printer, and, if the first user information is not linked to the second user information in the link information, generates a registration URL for registering the link information.

Embodiments are explained below with reference to the drawings. An image forming system according to the embodiment prints an image using an image forming apparatus, for example, a multifunction printer (MFP) installed in an office, workspace, or the like. The image forming system authenticates a user using user information included in a printing job. If succeeding in the authentication, the image forming system prints an image on a medium such as paper based on the printing job.

Figure 1:
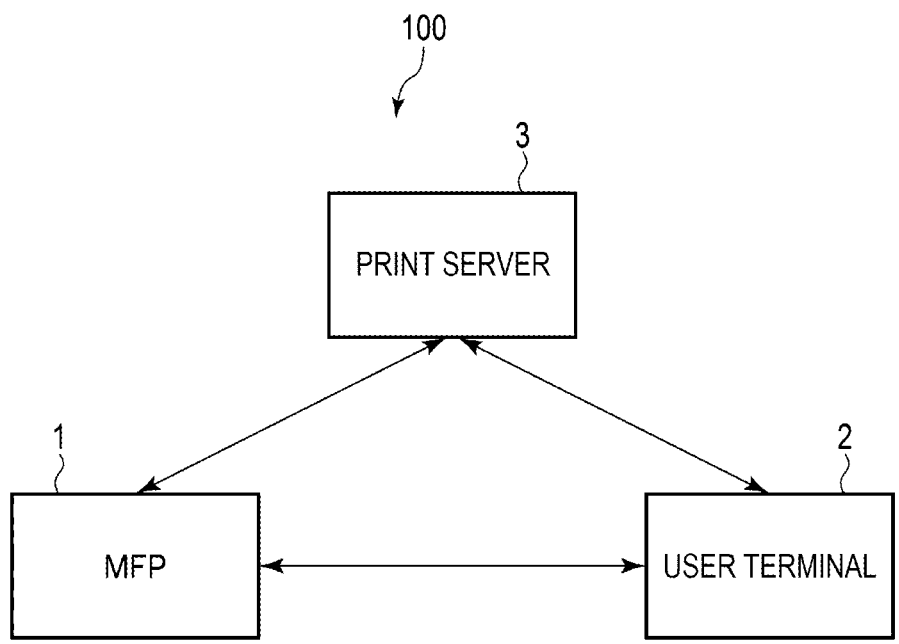
FIG. 1 is a block diagram illustrating an image forming system, according to some embodiments.

FIG. 1 illustrates a configuration example of an image forming system 100 according to some embodiments. As illustrated by FIG. 1, the image forming system 100 includes an image forming apparatus (e.g., printer), shown as multi-function printer (MFP) 1, a user terminal 2, and a print server 3. The print server 3 is connected to the MFP 1 and the user terminal 2. The MFP 1 is connected to the user terminal 2 (e.g., client, client device, client computing device, user interface associated with a client device communicably coupled to one or more host devices such as one or more servers).

The user terminal 2 is a terminal to which the user inputs operation (e.g., provides user inputs) for starting printing (e.g., the terminal 2 may receive one or more inputs associated with one or more inputs or commands regarding starting a printing operation of the printing apparatus). The user terminal 2 logs in to the print server 3 using user information (e.g., first user information) indicating and associated with the user. The user terminal 2 is explained in detail below.

In some embodiments, the first user information is a mail address belonging to a first domain. For example, if the first domain is AAA, the first user information is XXX@AAA. The first user information may be user information including a subdomain. For example, a message (e.g., electronic mail, email, etc.) transmitted to the first user information (that is, the mail address) can be viewed in the user terminal 2.

The print server 3 transmits a printing job to the MFP 1 according to operation from the logged-in user terminal 2. The print server 3 transmits a printing job including the first user information of the logged-in user terminal 2 and printing data to the MFP 1. The print server 3 may acquire printing data from the user terminal 2. The print server 3 may acquire printing data from an external Cloud (e.g., a communicably connected cloud computational system, an on-demand computing system resource, a cloud service, a remote database, a network computing element, etc.) or the like. The print server 3 may acquire printing data from an internal memory (e.g., one or more internal memory devices, one or more memory devices storing instructions thereon that when executed by one or more processors cause the one or more processors to perform one or more operations).

For example, the print server 3 and the user terminal 2 support a predetermined directory service that uses the first domain.

The MFP 1 prints an image based on the printing job transmitted from the print server 3. The MFP 1 authenticates the user using the first user information included in the printing job. If succeeding in the authentication, the MFP 1 prints the image based on the printing job. The MFP 1 does not support the directory service supported by the print server 3 and the user terminal 2. For example, the MFP 1 supports a predetermined directory service that uses a second domain different from the first domain.

Figure 2:
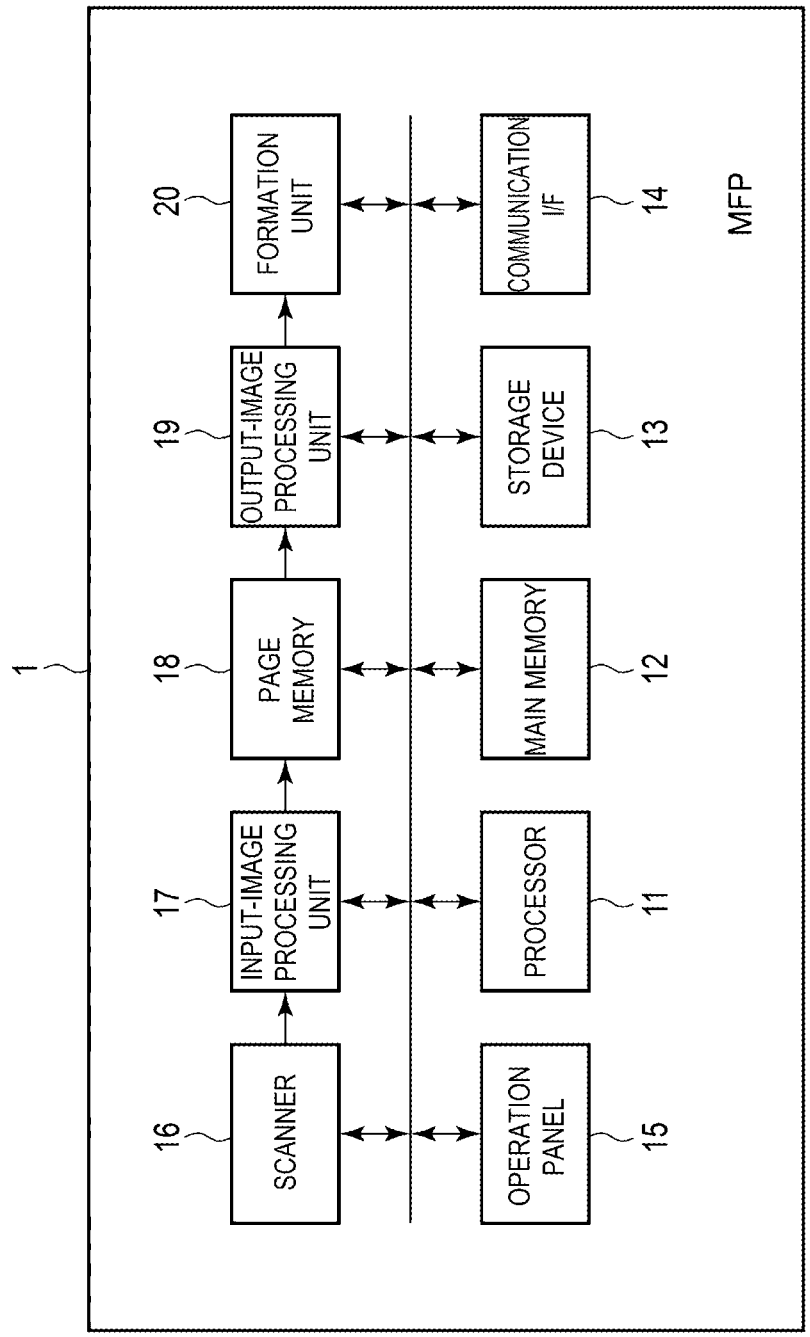
FIG. 2 is a block diagram illustrating a multi-functional printer (MFP) of FIG. 1, according to some embodiments.

FIG. 2 is a block diagram illustrating a configuration example of the MFP 1 according to some embodiments.

As illustrated by FIG. 2, the MFP 1 includes a processor 11, a main memory 12 (e.g., a primary memory system, a memory system, a first memory system, etc.), a storage device 13, a communication interface 14, an operation panel 15, a scanner 16, an input-image processing unit 17, a page memory 18, an output-image processing unit 19, and a formation unit 20. These units are connected to one another via a data bus or the like.

The MFP 1 may include components corresponding to necessity besides the components illustrated by FIG. 2. Specific components may be excluded from the MFP 1.

The processor 11 has a function of controlling an operation of the entire MFP 1. The processor 11 may include an internal memory and various interfaces. The processor 11 executes programs stored in advance in the internal memory, the storage device 13, or the like to thereby realize various functions.

A part of the various functions realized by the processor 11 executing the programs may be realized by a hardware circuit. In this case, the processor 11 controls the functions realized by the hardware circuit.

The main memory 12 is a volatile memory. The main memory 12 is a working memory or a buffer memory. The main memory 12 stores various application programs based on instructions given from the processor 11. The main memory 12 may store data necessary for execution of the application programs, execution results of the application programs, and the like.

The storage device 13 is a nonvolatile memory in which data can be written and rewritten. The storage device 13 is configured from, for example, a HDD (Hard Disk Drive), an SSD (Solid State Drive), or a flash memory. The storage device 13 stores control programs, applications, various data, and the like according to operation uses of the MFP 1.

The storage device 13 stores, in advance, second user information indicating a user who can perform printing in the MFP 1. The second user information indicates the user of the user terminal 2.

The second user information is a mail address belonging to a second domain different from the first domain. For example, if the second domain is BBB, the second user information is YYY@BBB. For example, the first user information may be XXX@AAA, and the second user information may be YYY@BBB. The second user information may include a subdomain. A user name (YYY) of the second user information may be the same as or may be different from the user name (XXX) of the first user information. For example, XXX@AAA, XXX@BBB or YYY@BBB. The user names, domains, and subdomains may include partitions or subcategorization, for example, subdomains of the same or different domains. For example, a domain (e.g., BBB), may have one or more partitions or subdomains (e.g., .aaa, .bbb, .ccc, etc.). For example, the first user information may be YYY@BBB and the second user information may be YYY@BBB.bbb. Likewise, the first user information may be YYY@BBB.bbb and the second user information may be YYY@BBB.

In some embodiments, a mail transmitted to the second user information (that is, for example, the mail address) can be viewed in the user terminal 2.

The storage device 13 stores link information that links the first user information and the second user information stored in advance (e.g., predetermined links between the first user information and the second user information). For example, the link information links the first user information and the second user information indicating the same user. For example, the link information includes links (e.g., a map, relationships, linking data, etc.) between the first user information and the second user information associated with a same user (e.g., a user that corresponding to both the first user information and the second user information).

The communication interface 14 is an interface for connection to the user terminal 2, the print server 3, and the like. That is, the communication interface 14 transmits and receives data to and from the user terminal 2, the print server 3, and the like via a predetermined network. For example, the communication interface 14 supports wired or wireless LAN (Local Area Network) connection.

The communication interface 14 may be connected to the user terminal 2 via a mail server or the like.

The communication interface 14 may be configured from an interface for connection to the user terminal 2 and an interface for connection to the print server 3.

Various instructions are input to the operation panel 15 (e.g., user interface) by an operator of the MFP 1. The operation panel 15 transmits a signal, message, and/or command indicating an instruction input by the operator to the processor 11. The operation panel 15 includes, for example, a keyboard, a numeric keypad, or a touch panel as an operation unit.

The operation panel 15 displays various kinds of information to the operator of the MFP 1. That is, the operation panel 15 displays, based on a signal transmitted from the processor 11, a screen showing various kinds of information. The operation panel 15 includes a monitor and/or display device, such as a liquid crystal display as a display unit. The display device may be configured to present information via one or more screens of a graphical user interface.

The scanner 16 optically scans an original and reads an image of the original as image data. The scanner 16 reads the original as a color image or a monochrome image. The scanner 16 is configured from a sensor row formed in a main scanning direction. The scanner 16 moves the sensor row in a sub-scanning direction and reads the entire original.

The input-image processing unit 17 processes the image data read by the scanner 16. The input-image processing unit 17 may process image data transmitted from a device other than the scanner 16. For example, the input-image processing unit 17 may process image data transmitted from a USB memory, a PC, a smartphone, or the like.

The page memory 18 stores the image data processed by the input-image processing unit 17.

The output-image processing unit 19 processes the image data stored by the page memory 18 such that the formation unit 20 (e.g., print head, print head system, etc.) can print the image data on a print medium (e.g., paper).

The formation unit 20 (a printer) prints, based on control of the processor 11, the image data processed by the output-image processing unit 19 on the paper.

The formation unit 20 prints the image data on the paper with an electrophotographic scheme. The formation unit 20 is configured from a transfer body, a photoconductive drum that transfers a toner image onto the transfer body, a transfer roller that transfers the toner image from the transfer body to the paper, a heater that heats the paper on which the toner image is transferred, and the like.

The formation unit 20 may print the image data on the paper with an inkjet scheme. A configuration of the formation unit 20 is not limited to a specific configuration.

Figure 3:
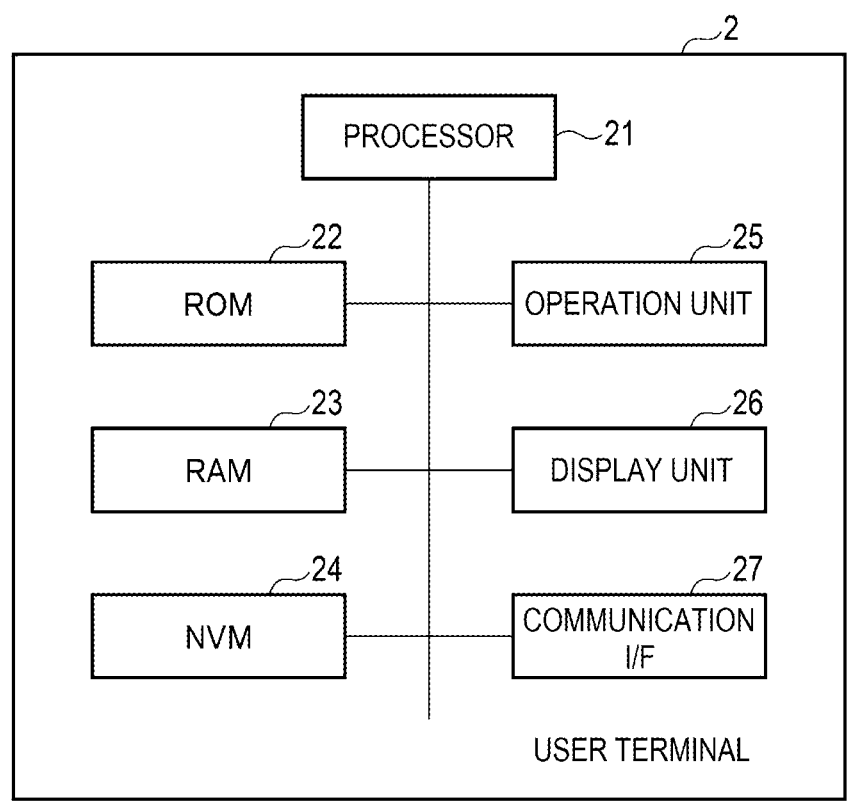
FIG. 3 is a block diagram illustrating a user terminal of FIG. 1, according to some embodiments.

FIG. 3 is a block diagram illustrating a configuration example of the user terminal 2, according to some embodiments. As illustrated by FIG. 3, the user terminal 2 includes a processor 21, a ROM 22, a RAM 23, an NVM 24, an operation unit 25, a display unit 26, and a communication interface 27.

The processor 21, the ROM 22, the RAM 23, the NVM 24, the operation unit 25, the display unit 26, and the communication interface 27 are connected to one another via a data bus or the like.

The user terminal 2 may include components corresponding to necessity besides the components illustrated by FIG. 3. Specific components may be excluded from the user terminal 2.

The processor 21 has a function of controlling an operation of the entire user terminal 2. The processor 21 may include an internal cache and various interfaces. The processor 21 executes programs stored by an internal memory, the ROM 22, or the NVM 24 in advance to thereby realize various functions.

A part of the various functions realized by the processor 21 executing the programs may be realized by a hardware circuit. In this case, the processor 21 controls the functions executed by the hardware circuit.

The ROM 22 is a nonvolatile memory in which control programs, control data, and the like are stored in advance. The control programs and the control data stored in the ROM 22 are incorporated in advance according to the specifications of the user terminal 2.

The RAM 23 is a volatile memory. The RAM 23 temporarily stores data and the like being processed by the processor 21. The RAM 23 stores various application programs based on an instruction given from the processor 21. The RAM 23 may store data necessary for execution of the application programs, execution results of the application programs, and the like.

The NVM 24 is a nonvolatile memory in which data can be written and rewritten. The NVM 24 is configured from, for example, a HDD, an SSD, or a flash memory. The NVM 24 stores control programs, applications, various data, and the like according to operation uses of the user terminal 2.

The operation unit 25 receives input of various kinds of operation from an operator. The operation unit 25 transmits a signal indicating the input operation to the processor 21. For example, the operation unit 25 is configured from a mouse, a keyboard, a touch panel, or the like.

The display unit 26 displays data transmitted from the processor 21. For example, the display unit 26 is configured from a liquid crystal monitor. If the operation unit 25 is configured from the touch panel, the display unit 26 may be formed integrally with the touch panel functioning as the operation unit 25.

The communication interface 27 is an interface for transmitting and receiving data to and from the MFP 1, the print server 3, and the like. For example, the communication interface 27 is connected to the MFP 1 and the print server 3 via a network or the like. The communication interface 27 supports wired or wireless LAN connection.

The communication interface 27 is configured from an interface for transmitting and receiving data to and from the MFP 1 and an interface for transmitting and receiving data to and from the print server 3.

Subsequently, functions realized by the MFP 1 are explained. The functions realized by the MFP 1 are realized by the processor 11 executing programs stored in the internal memory, the storage device 13, or the like.

First, the processor 11 has a function of receiving a printing job from the print server 3.

As explained above, the print server 3 transmits the printing job including the first user information and the printing data to the MFP 1.

The processor 11 receives the printing job from the print server 3 through the communication interface 14.

The processor 11 has a function of determining whether the received printing job is printable.

If receiving the printing job, the processor 11 extracts the first user information from the printing job. After extracting the first user information, the processor 11 refers to the link information and determines whether the extracted first user information is linked to the second user information.

If determining that the extracted first user information is linked to the second user information, the processor 11 determines that the printing job is printable. If determining that the printing job is printable, the processor 11 prints the printing data of the printing job on a medium using the formation unit 20.

If determining that the extracted first user information is not linked to the second user information, the processor 11 determines that the printing job is unprintable.

The processor 11 has a function of, if determining that the printing job is unprintable, transmitting a URL (Uniform Resource Locator) (a registration URL) for registering the link information, to the user terminal 2. For example, the URL may be an address of a webpage or interface configured to manage link information regarding a link between the first user information and the second information.

If determining that the printing job is unprintable, the processor 11 generates a registration URL for registering link information for linking the first user information included in the printing job to the second user information. For example, the processor 11 generates a registration URL including a domain (which may or may not be a domain belonging to the second domain) indicating the MFP 1 and a parameter for registering the link information. For example, the parameter relates to the first user information.

After generating the registration URL, the processor 11 transmits the registration URL to the user terminal 2 based on the first user information. For example, the processor 11 transmits the registration URL to the first user information (that is, the mail address). The processor 11 may transmit, in addition to the registration URL, for example, a message indicating that the printing job is unprintable to the user terminal 2.

In some embodiments, the processor 11 is configured to register the link information.

It is assumed that the user terminal 2 accesses the registration URL according to operation of the user. It is assumed that the user terminal 2 logs in to the MFP 1 based on the second user information.

The processor 11 detects an access to the URL through the communication interface 14. If detecting the access, the processor 11 receives login processing from the user terminal 2 through the communication interface 14. For example, as the login processing, the processor 11 receives the second user information, a password, and the like from the user terminal 2.

The processor 11 performs processing for linking the first user information and the second user information input from the user terminal 2 through the communication interface 14. After performing the processing, the processor 11 stores the link information for linking the first user information and the second user information in the storage device 13.

After storing the link information in the storage device 13, the processor 11 transmits, through the communication interface 14 or the like, a notification indicating that the link information is registered to a predetermined destination (for example, an administrator).

Subsequently, functions realized by the user terminal 2 are explained. The functions realized by the user terminal 2 are realized by the processor 21 executing programs stored in the internal memory, the ROM 22, the NVM 24, or the like.

First, the processor 21 has a function of causing the print server 3 to transmit a printing job.

The processor 21 logs in to the print server 3 with the first user information according to operation of the user. For example, the processor 21 transmits the first user information, the password, and the like to the print server 3 through the communication interface 27.

If succeeding in the login, the processor 21 inputs, through the operation unit 25, operation for executing printing. For example, the processor 21 inputs, through the operation unit 25, operation for selecting printing data, operation for printing the selected printing data, and the like.

After inputting the operation for executing printing, the processor 21 transmits, to the print server 3, through the communication interface 27, an operation signal for causing the print server 3 to transmit a printing job including the selected printing data and the first user information to the MFP 1.

The print server 3 transmits the printing job to the MFP 1 according to the operation signal.

The processor 21 has a function of accessing the registration URL to register the link information.

As explained above, the processor 11 of the MFP 1 transmit the registration URL to the user terminal 2 through the communication interface 14.

The processor 21 of the user terminal 2 receives the registration URL through the communication interface 27. If receiving the registration URL, the processor 21 receives, from the user, through the operation unit 25, operation for accessing (e.g., an input regarding accessing) the registration URL.

If receiving the operation, the processor 21 accesses the MFP 1 according to the registration URL through the communication interface 27. The processor 21 logs in to the MFP 1 using the second user information. For example, the processor 21 transmits the second user information and the password to the MFP 1.

If succeeding in the login, the processor 21 supplies operation for linking the first user information and the second user information to the MFP 1 according to operation of the user.

In some embodiments, the MFP 1 registers the link information according to the operation as explained above.

Subsequently, an operation example of the MFP 1 is explained.

First, an operation example in the case in which the MFP 1 receives the printing job is explained.

Figure 4:
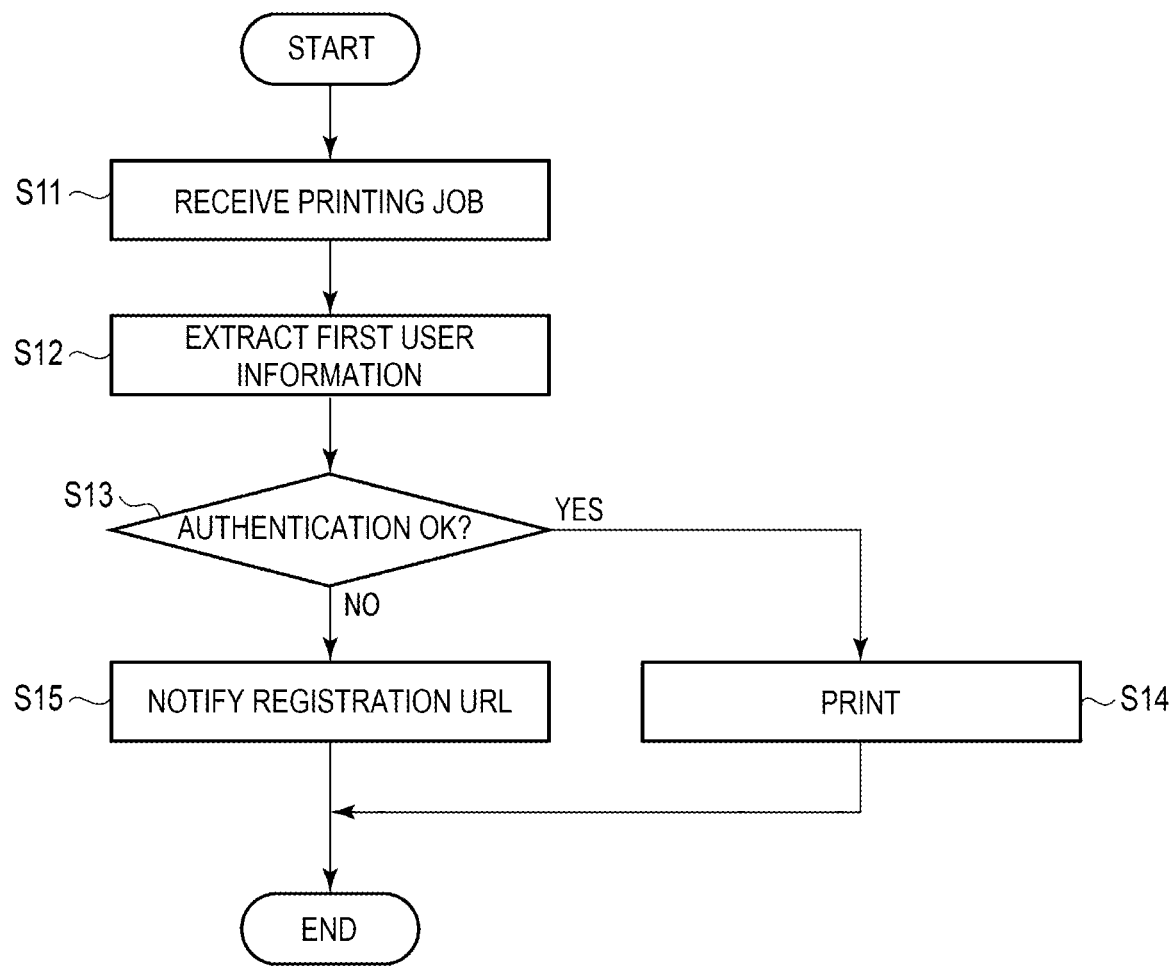
FIG. 4 is a flowchart illustrating an operation example of the MFP of FIG. 2, according to some embodiments.

FIG. 4 is a flowchart for explaining the operation example in the case in which the MFP 1 receives the printing job, according to some embodiments.

The processor 11 of the MFP 1 receives the printing job from the print server 3 through the communication interface 14 (Act 11). If receiving the printing job from the print server 3, the processor 11 extracts the first user information from the printing job (Act 12).

After extracting the first user information, the processor 11 refers to the link information and authenticates the extracted first user information (Act 13). That is, the processor 11 determines whether the extracted first user information is linked to the second user information.

If succeeding in the authentication (YES in Act 13), the processor 11 prints the printing data included in the printing job on a medium using, for example, the formation unit 20 (Act 14).

If failing in the authentication (NO in Act 13), the processor 11 transmits the registration URL to the user terminal 2 through the communication interface 14 (Act 15).

If printing the printing data on the medium (Act 14) or if transmitting the registration URL to the user terminal 2 (Act 15), the processor 11 ends the operation.

Subsequently, an operation example in which the processor 11 registers the link information is explained.

FIG. 5 is a flowchart for explaining the operation example in which the processor 11 registers the link information, according to some embodiments.

First, the processor 11 detects an access to the registration URL through the communication interface 14 (Act 21). If detecting the access, the processor 11 executes login processing based on the second user information (Act 22).

If succeeding in the login (YES in Act 22), the processor 11 registers the link information (Act 23). After registering the link information, the processor 11 transmits, through the communication interface 14, a notification indicating that the link information is registered to a predetermined destination such as the administrator (Act 24).

If failing in the login (NO in Act 22) or if transmitting the notification (Act 24), the processor 11 ends the operation.

The processor 11 may print an image based on limitations (a time period, the number of prints, color propriety, and the like) applied to the second user information linked to the first user information included in the printing job. For example, the processor 11 may determine that printing cannot be performed because of the limitations relating to the second user information even if the first user information is linked to the second user information.

The processor 11 may delete the link information from the storage device 13 if a predetermined period elapses after the link information is registered. The processor 11 may delete the link information from the storage device 13 if a predetermined period elapses from the last printing performed using the link information.

The link information may be link information for linking a plurality of kinds of first user information and one kind of second user information.

If the registration URL cannot be transmitted to the user terminal 2 based on the first user information (for example, transmission of a mail is in error), the processor 11 of the MFP 1 may transmit the registration URL to the predetermined destination such as the administrator through the communication interface 14.

The first user information may be a telephone number. In this case, the processor 11 may transmit the registration URL to the first user information (that is, the telephone number) as a text message. A configuration of the first user information is not limited to a specific configuration.

The image forming system configured as explained above transmits the printing job from the print server that uses the first user information belonging to the first domain to the MFP that uses the second user information belonging to the second domain. If the first user information and the second user information is linked in the MFP, the image forming system prints an image.

On the other hand, if failing in the authentication (e.g., NO in Act 21), the image forming system issues the URL for registering the link information for linking the first user information and the second user information. The image forming system registers the link information by accessing the URL.

As a result, the image forming system can authenticate the user using user information belonging to a different domain and print an image.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a communication interface configured to receive a message regarding a print job and including first user information of a first domain;
a printer configured to print an image; and
a processing circuit comprising a processor and a memory, the memory storing instructions thereon that when executed by the processor cause the processor to:
store, via the memory, (i) second user information regarding users who can perform printing and belong to a second domain different from the first domain, and (ii) link information regarding linking the first user information and the second user information; and
extract the first user information from the message based on a determination that the first user information is linked to the second user information in the link information;
print, via the printer, an image based on the print job; and
based on a determination that the first user information is not linked to the second user information in the link information, generate a registration URL for registering the link information and generate a message for the user indicating that the print job is not printable.

2. The image forming apparatus of claim 1, wherein the processor transmits the registration URL based on the first user information through the communication interface.

3. The image forming apparatus of claim 2, wherein the first user information is a mail address.

4. The image forming apparatus of claim 1, wherein the registration URL includes a domain indicating a domain associated with the image forming apparatus.

5. The image forming apparatus of claim 4, wherein the registration URL includes a parameter relating to the first user information.

6. The image forming apparatus of claim 4, wherein the processor stores the link information in the memory by accessing the registration URL.

7. The image forming apparatus of claim 6, wherein, when storing the link information in the memory by accessing the registration URL, the processor transmits a notification through the communication interface.

8. The image forming apparatus of claim 6, wherein the processor deletes the link information when a predetermined time elapses after the link information is stored.

9. The image forming apparatus of claim 6, wherein the processor deletes the link information when a predetermined period elapses from last printing performed using the link information.

10. A method, comprising:
receiving, via a processing circuit, a message regarding a print job and including first user information of a first domain;
extracting, via the processing circuit, the first user information from the printing job;
based on a determination that the first user information is linked to, in a link information, second user information indicating a user who can perform printing and belonging to a second domain different from the first domain:
printing an image based on the print job; and
based on a determination that the first user information is not linked to the second user information in the link information:
generating a registration URL for registering the link information and generating a message for the user indicating that the print job is not printable.

11. The method of claim 10, further comprising transmitting, via the processing circuit and a communication interface, the registration URL based on the first user information.

12. The method of claim 11, wherein the first user information is a mail address.

13. The method of claim 10, wherein the registration URL includes a domain indicating a domain of an image forming apparatus.

14. The method of claim 10, wherein the registration URL includes a parameter relating to the first user information.

15. The method of claim 10, further comprising storing, via the processing circuit, the link information by accessing the registration URL.

16. The method of claim 15, further comprising transmitting, via the processing circuit and a communication interface, a notification through the communication interface when storing the link information by accessing the registration URL.

17. The method of claim 15, further comprising deleting, via the processing circuit, the link information based on a comparison between a predetermined value and a period of time corresponding to a period of time after the link information is stored.

18. The method of claim 15, further comprising deleting, via the processing circuit, the link information based on a comparison between a threshold value and an elapsed time since a printing job performed using the link information.

19. An image forming apparatus, comprising:
a communication interface configured to receive a message regarding a print job and including first user information of a first domain;
a printer configured to print an image; and
a processing circuit comprising a processor and a memory, the memory storing instructions thereon that when executed by the processor cause the processing circuit to:
obtain second user information regarding users who can perform printing and belonging to a second domain different from the first domain;
obtain link information regarding linking the first user information and the second user information;
based on a determination that the first user information is linked to the second user information in the link information:
extract the first user information from the message; and
print, via the printer, an image based on the print job; and
based on a determination that the first user information is not linked to the second user information in the link information:
generate a registration message regarding registering a link between the first user information and the second user information, and generate a message for the user indicating that the print job is not printable.

20. The image forming apparatus of claim 19, wherein the first user information is an electronic mail address.

* * * * *